United States Patent
Meyer

(10) Patent No.: US 6,832,592 B2
(45) Date of Patent: Dec. 21, 2004

(54) CRANKSHAFT COUPLING STRUCTURE FOR USE IN AN INTERNAL COMBUSTION ENGINE

(76) Inventor: Siegfried Meyer, Spitalgasse 1, 86732 Oettingen (DE)

( * ) Notice: Subject to any disclaimer, the term of this patent is extended or adjusted under 35 U.S.C. 154(b) by 0 days.

(21) Appl. No.: 10/772,325

(22) Filed: Feb. 6, 2004

(65) Prior Publication Data

US 2004/0187836 A1 Sep. 30, 2004

Related U.S. Application Data

(60) Provisional application No. 60/457,303, filed on Mar. 26, 2003.

(51) Int. Cl.[7] ................................................ F02B 75/32
(52) U.S. Cl. ................................ 123/197.3; 123/197.2; 74/579 E
(58) Field of Search ........................... 123/197.1, 197.2, 123/197.3, 197.4; 74/579 E Primary Examiner—Noah P. Kamen
(74) Attorney, Agent, or Firm—Rosenberg, Klein & Lee

(57) ABSTRACT

A crankshaft coupling structure used in an engine and coupled between a piston and a crankshaft to enhance the output torque of the engine is disclosed to include a connecting rod, the connecting rod having a top end coupled to the piston by a slip joint and a bottom end pivoted to the crankshaft, and a slide slidably coupled to a sloping face inside the piston above the oblong coupling hole, the slide having two bottom lugs bilaterally pivoted to the top end of the connecting rod above the oblong coupling hole of the piston.

2 Claims, 4 Drawing Sheets

CRANKSHAFT COUPLING STRUCTURE FOR USE IN AN INTERNAL COMBUSTION ENGINE

This application claims benefit of 60/457,303 filed on Mar. 26, 2003

BACKGROUND OF THE INVENTION

1. Field of the Invention

The present invention relates to an internal combustion end and, more specifically, to a crankshaft coupling structure for use in an internal combustion engine to connect a crankshaft to a piston and to increase the output torque of the engine.

2. Description of the Related Art

In a typical internal combustion engine, of the type found in most vehicles today, a plurality of pistons are respectively movably mounted in a plurality of cylinders formed in an engine block. Each of the pistons has one end connected with a piston rod and the other end coupled to a crankshaft. When spark plugs in the engine block fired to ignite fuel mixture, the pistons are driven downward to turn the crankshaft, which ultimately drives the entire vehicle. At present, in a typical engine, connecting rods are used and connected with the respective first end to the corresponding piston and the respective second end to the corresponding crankshaft. The connecting points between the two ends of each connecting rod and the corresponding piston and corresponding crankshaft are disposed at the ends of the longitudinal center axis of the respective connecting rod. By means of the coupling of the connecting rod between the corresponding piston and the corresponding crankshaft, reciprocating motion of the piston causes the corresponding crankshaft to rotate.

Presently, researchers have reported many studies to enhance the output torque by extending the moving distance of the connecting rods between the pistons and the crankshafts.

SUMMARY OF THE INVENTION

The present invention has been accomplished under the circumstances in view. It is one object of the present invention to provide a crankshaft coupling structure for engine, which greatly enhances the output torque of the engine.

It is another object of the present invention to provide a crankshaft coupling structure for use engine, which saves fuel consumption of the engine.

It is still another object of the present invention to provide a crankshaft coupling structure for engine, which improves the performance of the engine, resulting in reduced amount of solid matter in exhaust gas of the engine.

To achieve these and other objects of the present invention, the crankshaft coupling structure comprises a piston reciprocating in a cylinder inside an engine, the piston having an oblong coupling hole and a sloping face spaced above the oblong coupling hole; a connecting rod, the connecting rod having a top end coupled to the oblong coupling hole of the piston and a bottom end pivoted to a crankshaft; a slide coupled to the sloping face of the piston and movable along the sloping face between bottom and top sides of the sloping face, the slide having at least one bottom lug respectively pivoted to the top end of the connecting rod above the oblong coupling hole; and a roller assembly provided between the slide and the sloping face of the piston and adapted to smoothen movement of the slide along the sloping face.

BRIEF DESCRIPTION OF THE DRAWINGS

The accompanying drawing is included to provide a further understanding of the invention, and is incorporated in and constitutes a part of this specification. The drawing illustrates an embodiment of the invention and, together with the description, serves to explain the principles of the invention. In the drawing.

DETAILED DESCRIPTION OF THE PREFERRED EMBODIMENT

Figure 1:
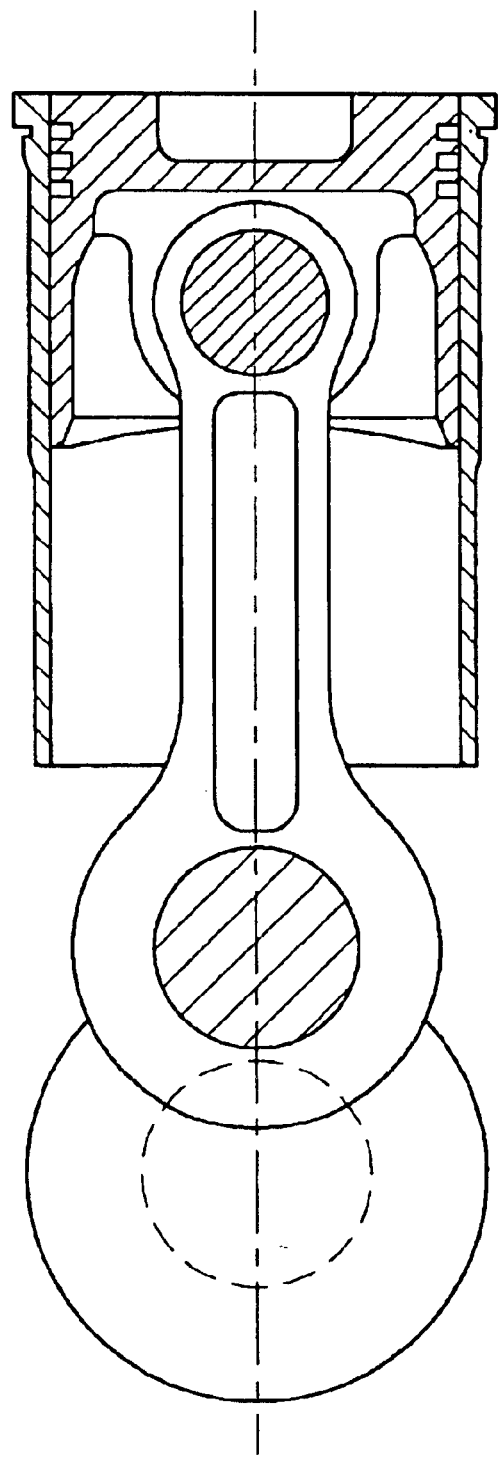
FIG. 1 is a sectional side plain view of the prior art design.

Reference will now be made in detail to the preferred embodiment of the present invention, examples of which are illustrated in the accompanying drawings. Wherever possible, the same reference numbers are used in the drawings and the description to refer to the same or like parts.

Figure 2:
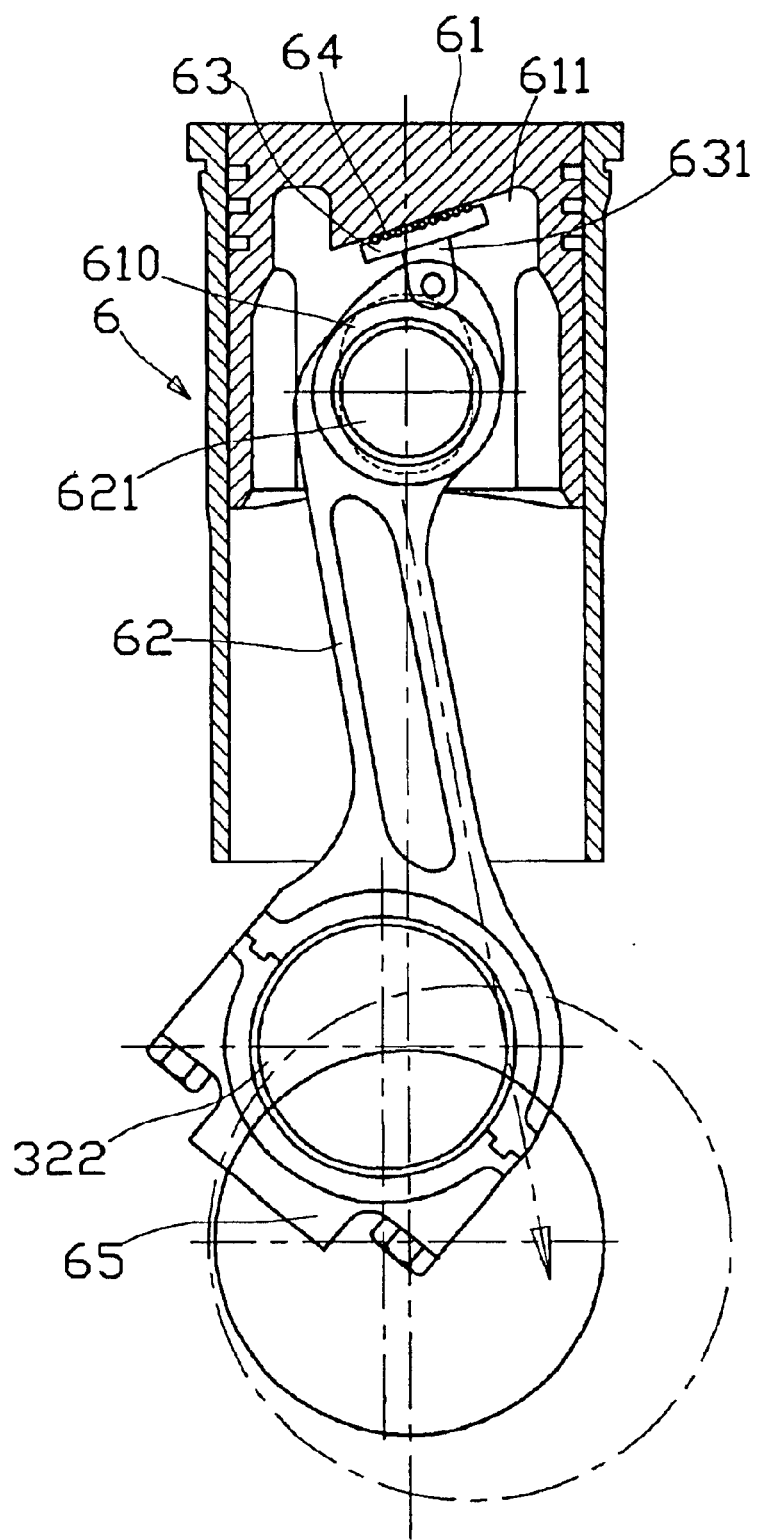
FIG. 2 is a sectional view showing the arrangement of a crankshaft coupling structure between a crankshaft and a piston according to the present invention.
Figures 3A, 3B:
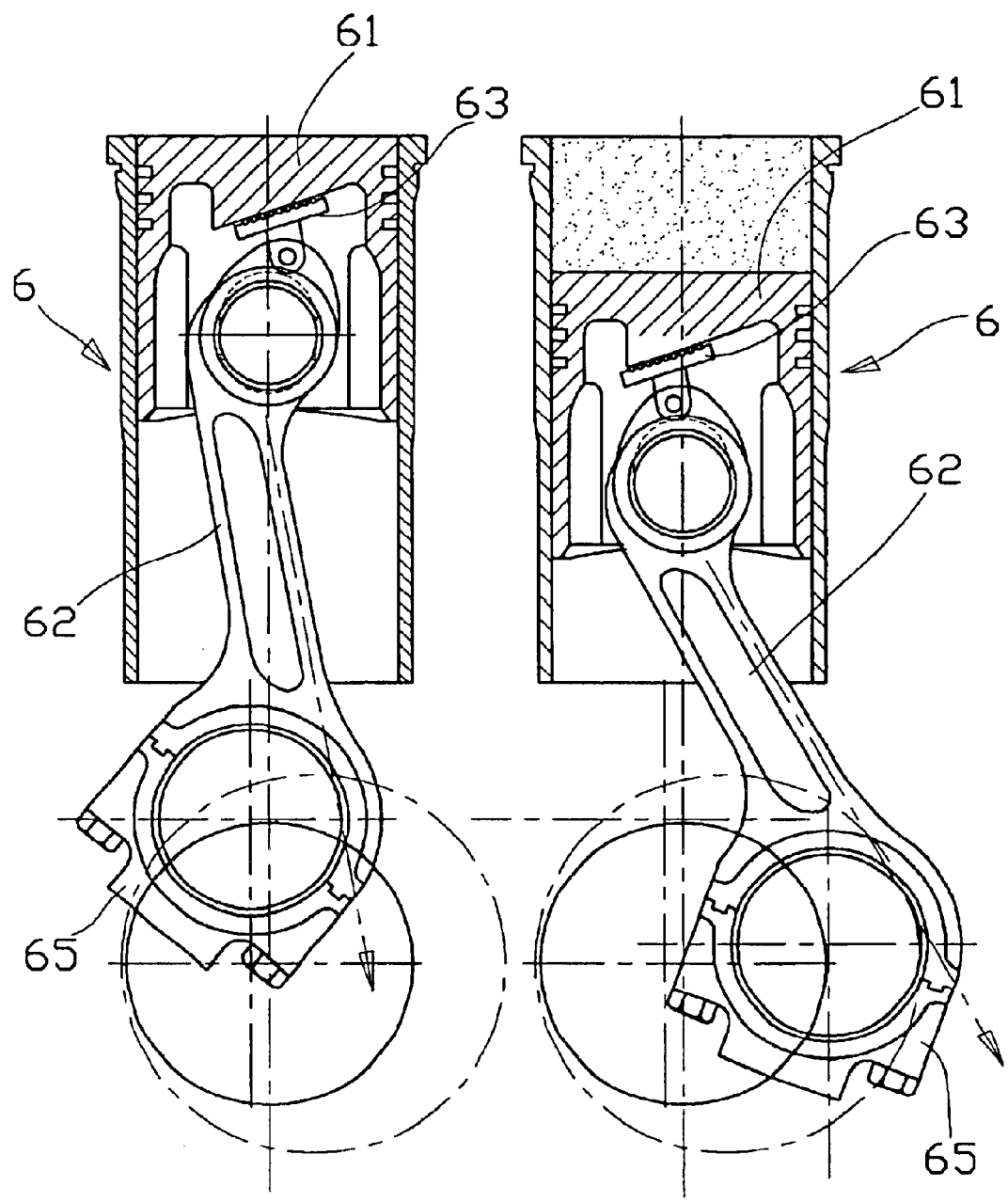
FIGS. 3A–3D are schematic drawings showing one moving cycle of the crankshaft coupling structure with the piston from the top dead center to the bottom dead center and then from the bottom dead center back toward the top dead center according to the present invention.
Figures 3C, 3D:
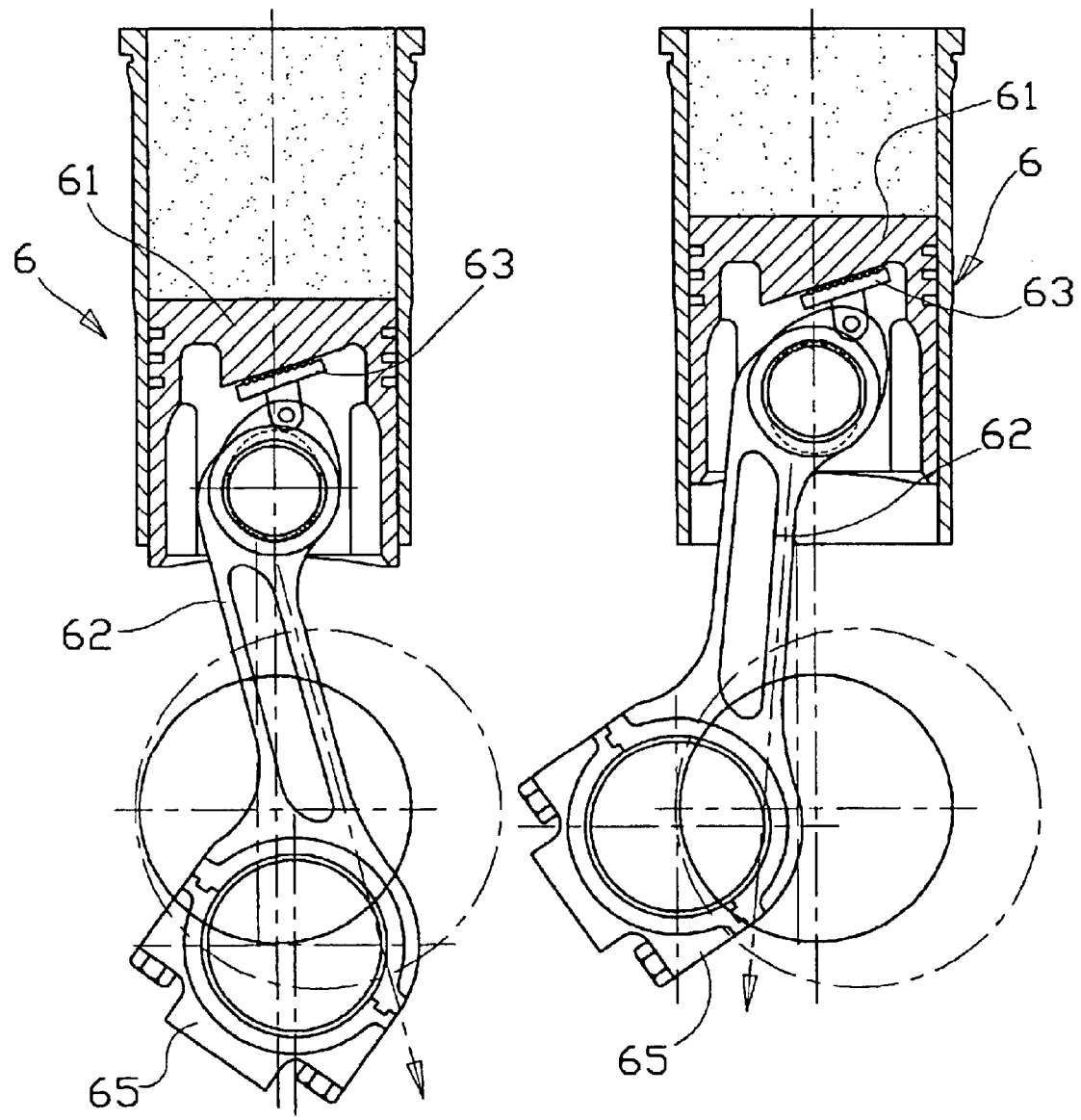

Referring to FIG. 2, a crankshaft coupling structure 6 is shown comprised of a piston 61, a connecting rod 62, a slide 63, a roller assembly 54, and a crankshaft 65.

The piston 61 is a hollow member axially movably mounted in a cylinder (not shown) in an engine (not shown), having an oblong coupling hole 610 and an inside sloping face 611 spaced above the oblong coupling hole 610.

The connecting rod 62 has a top end coupled to the oblong coupling hole 610 of the piston 61 by a piston pivot pin 621, and a bottom end pivoted to the crankshaft 65 by a crankshaft pivot pin 622.

The slide 63 is coupled to the sloping face 611 of the piston 61, and moved along the sloping face 611 between the top and bottom sides of the sloping face 611, having two parallel bottom lugs 631 respectively pivoted to the top end of the connecting rod 62.

The roller assembly 64 is provided between the sloping face 611 of the piston 61 and the slide 63, for enabling the slide 63 to be moved along the sloping face 611 smoothly and stably.

Referring to FIGS. 3A–3D, when the crankshaft coupling structure 6 moved with the piston 61 to the top dead center in the combustion chamber, the slide 63 is moved to the top side of the sloping face 611, and the piston pivot pin 621 is moved with the connecting rod 62 to the top end of the oblong coupling hole 610. During the down stroke of the piston 61 from the top dead center in the combustion chamber to the bottom dead center, the slide 63 is moved to the bottom side of the sloping face 611, and the piston pivot pin 621 is moved with the connecting rod 62 to the bottom end of the oblong coupling hole 610 Therefore, the invention extends the stroke of the connecting rod 62, enhancing the output torque of the engine.

As indicated above, the crankshaft coupling structure of the present invention uses a slip joint to couple the connecting rod to the piston and a slide to couple a second connecting point of the connecting rod to a sloping face inside the piston. This arrangement greatly enhances the output torque of the engine. Because the invention greatly improves the performance of the engine, it saves fuel consumption of the engine and reduces the production of waste gas.

A prototype of crankshaft coupling structure for engine has been constructed with the features of FIGS. 2~3. The crankshaft coupling structure for engine functions smoothly to provide all of the features discussed earlier.

Although a particular embodiment of the invention has been described in detail for purposes of illustration, various modifications and enhancements may be made without departing from the spirit and scope of the invention. Accordingly, the invention is not to be limited except as by the appended claims.

What is claimed is:

1. A crankshaft coupling structure comprising:
   a piston reciprocating in a cylinder inside an engine, said piston having an oblong coupling hole and a sloping face spaced above said oblong coupling hole;
   a connecting rod, said connecting rod having a top end coupled to the oblong coupling hole of said piston and a bottom end pivoted to a crankshaft; and
   a slide coupled to the sloping face of said piston and movable along said sloping face between bottom and top sides of said sloping face, said slide having at least one bottom lug respectively pivoted to the top end of said connecting rod above said oblong coupling hole.

2. The crankshaft coupling structure as claimed in claim 1, further comprising a roller assembly provided between said slide and the sloping face of said piston and adapted to smoothen movement of said slide along said sloping face.

* * * * *